United States Patent
Henttonen et al.

(10) Patent No.: US 8,494,467 B2
(45) Date of Patent: Jul. 23, 2013

(54) AUTOMATIC GAIN CONTROL CONFIGURATION

(75) Inventors: Tero Henttonen, Espoo (FI); Timo Roman, Espoo (FI); Chris Callender, Hampshire (GB); Anders Ostergaard Nielsen, Frederiksberg C (DK); Kaj Jansen, Salo (FI)

(73) Assignee: Renesas Mobile Corporation, Tokyo (JP)

( * ) Notice: Subject to any disclaimer, the term of this patent is extended or adjusted under 35 U.S.C. 154(b) by 58 days.

(21) Appl. No.: 13/180,791

(22) Filed: Jul. 12, 2011

(65) Prior Publication Data
US 2013/0017793 A1    Jan. 17, 2013

(51) Int. Cl.
*H04B 17/02*    (2006.01)

(52) U.S. Cl.
USPC ......... 455/136; 455/138; 455/239.1; 375/345

(58) Field of Classification Search
USPC ................ 455/136, 138, 239.1, 240.1, 232.1, 455/250.1; 375/345, 317, 318; 330/279, 136, 330/140, 141
See application file for complete search history.

(56) References Cited

U.S. PATENT DOCUMENTS

| | | | |
|---|---|---|---|
| 5,267,272 A * | 11/1993 | Cai et al. | 375/345 |
| 5,507,023 A * | 4/1996 | Suganuma et al. | 455/234.1 |
| 6,567,645 B1 * | 5/2003 | Wiedeman et al. | 455/12.1 |
| 6,600,374 B2 * | 7/2003 | Nguyen et al. | 330/279 |
| 6,731,910 B2 * | 5/2004 | Taira et al. | 455/69 |
| 7,065,335 B2 * | 6/2006 | Ben-Ayun et al. | 455/240.1 |
| 7,254,194 B2 * | 8/2007 | Lin et al. | 375/345 |
| 7,570,718 B2 * | 8/2009 | Tashiro | 375/326 |
| 7,720,133 B2 * | 5/2010 | Koyama et al. | 375/147 |
| 2001/0016019 A1 * | 8/2001 | Kaku et al. | 375/345 |
| 2004/0009758 A1 * | 1/2004 | Graham et al. | 455/234.1 |
| 2011/0243038 A1 * | 10/2011 | Challa et al. | 370/280 |

* cited by examiner

*Primary Examiner* — Minh D Dao
(74) *Attorney, Agent, or Firm* — Alston & Bird LLP (57) ABSTRACT

The invention teaches a solution, for example, for Long Term Evolution (LTE) networks. The solution comprises determining a measurement pattern for at least one automatic gain control tracking loop when resource restrictions have been configured for a user equipment, the resource restrictions comprising at least one measurement restriction pattern, wherein each automatic gain control tracking loop is associated with at least one measurement restriction pattern; and performing automatic gain control measurements according to the measurement patterns of the at least one automatic gain control tracking loop.

25 Claims, 3 Drawing Sheets

AUTOMATIC GAIN CONTROL CONFIGURATION

FIELD OF THE INVENTION

The invention relates to wireless communications. More specifically, the invention relates to an automatic gain control configuration.

BACKGROUND OF THE INVENTION

Long Term Evolution (LTE) is a 4G wireless broadband technology developed by the Third Generation Partnership Project (3GPP). LTE provides significantly increased peak data rates, reduced latency, scalable bandwidth capacity, and backwards compatibility with existing GSM and UMTS technology. The upper layers of LTE are based upon TCP/IP. LTE supports mixed data, voice, video and messaging traffic. LTE uses OFDM (Orthogonal Frequency Division Multiplexing) and/or MIMO (Multiple Input Multiple Output) antenna technology.

LTE radio access technology (E-UTRAN) may use enhanced inter-cell interference coordination (eICIC) functionality. The use of eICIC techniques is motivated by the emergence of denser and less coordinated network deployments with smaller cells. Having additional pico or femto co-channel layer within a typical (for example homogeneous) macro network topology can provide significant system capacity benefit. The idea is that network nodes coordinate resources between them in such a way that it enhances overall system capacity. The benefits come from the fact that user equipment (UE) may, for example, access pico layer eNBs with a better link budget compared to macro layer eNodeB (eNB), which leads to increased downlink throughput and better uplink coverage—meaning also less uplink transmit power which means less uplink interference caused to other cells.

Two basic types of example use cases have been envisioned: Macro/pico deployment and a macro/femto deployment. In a macro/pico deployment, macro nodes may mute a subset of subframes to enable terminals connected to pico nodes exchange data with reduced interference from the macro node. In a macro/femto deployment, closed-access femto nodes may mute some subframes to allow macro terminals in the vicinity of the femtos to stay connected to their serving macro cell. The muted subframes are called Almost Blank Subframes (ABS). In the muted subframes, there may still be residual interference due to transmission of Common Reference Symbols (CRS) and other physical channels containing essential information (for example system information, paging).

Time Division Multiplexing (TDM) eICIC is typically utilized when it is assumed that the user equipment may experience heavy co-channel interference from neighbor cells. In such a case, the co-channel interference patterns become time-varying by nature, partly because of TDM partitioning causing some resources to be occasionally muted. The ABS patterns utilized in TDM eICIC that are used by the network at a given point of time are unknown to the user equipment. However, subsets of the patterns, intended for restricting Radio Resource Management (RRM), Radio Link Monitoring (RLM) or Channel State Information (CSI) measurements may be configured for the UE to enable eICIC techniques. When such resource restrictions are configured, a user equipment may be signaled one subset of subframes to be used for serving cell RRM/RLM measurement purposes, one set for neighbor cell RRM measurement purposes and two subsets of subframes for CSI (CQI/PMI/RI) measurement purposes. Such subsets of subframes are also called patterns.

An Automatic Gain Control (AGC) operation in a user equipment is typically a slowly adapting loop which follows the received signal amplitude and power over several contiguous subframes in time. Its purpose is to adjust the received signal level such that the signal can be decoded properly and efficiently.

When ABS patterns are used, normal AGC operation may be degraded because received signal power fluctuates faster and with larger dynamic range than expected. In TDM eICIC operation, a user equipment receiver front-end may experience high signal amplitude in one subframe and a clearly lower signal amplitude in another subframe, which means that the variation of received power from one subframe to another depends on the ABS pattern used by network nodes (neighbor cells) and also on the overall load of the network itself. Hence, the received power variations may fluctuate heavily, leading to inefficient AGC operation.

Based on the above, there is a need for a solution that would solve or at least mitigate the above problems or drawbacks.

SUMMARY

According to a first aspect of the invention, there is provided a method comprising determining a measurement pattern for at least one automatic gain control tracking loop according to resource restrictions that are applied to a user equipment, the resource restrictions comprising at least one measurement restriction pattern, and performing automatic gain control measurements according to the measurement patterns of the at least one automatic gain control tracking loop.

According to a second aspect of the invention, there is provided an apparatus comprising at least one processor configured to cause the apparatus to determine a measurement pattern for at least one automatic gain control tracking loop according to resource restrictions that are applied to a user equipment, the resource restrictions comprising at least one measurement restriction pattern, and to perform automatic gain control measurements according to the measurement patterns of the at least one automatic gain control tracking loop.

According to a third aspect of the invention, there is provided a computer-readable medium comprising a computer program bearing computer program code for use with a computer. The computer program code comprises code for determining a measurement pattern for at least one automatic gain control tracking loop according to resource restrictions that are applied to a user equipment, the resource restrictions comprising at least one measurement restriction pattern, and code for performing automatic gain control measurements according to the measurement patterns of the at least one automatic gain control tracking loop.

According to a fourth aspect of the invention, there is provided an apparatus comprising means for determining a measurement pattern for at least one automatic gain control tracking loop according to resource restrictions that are applied to a user equipment, the resource restrictions comprising at least one measurement restriction pattern, and means for performing automatic gain control measurements according to the measurement patterns of the at least one automatic gain control tracking loop.

According to a fifth aspect of the invention, there is provided a method comprising determining a measurement pattern for at least one automatic gain control tracking loop according to resource restrictions that are applied to a user equipment, the resource restrictions comprising at least one measurement restriction pattern, and causing the measurement pattern for at least one automatic gain control tracking loop to be transmitted to the user equipment.

According to a sixth aspect of the invention, there is provided an apparatus comprising at least one processor configured to cause the apparatus to determine a measurement pattern for at least one automatic gain control tracking loop according to resource restrictions that are applied to a user equipment, the resource restrictions comprising at least one measurement restriction pattern, and to cause the measurement pattern for at least one automatic gain control tracking loop to be transmitted to the user equipment.

According to a seventh aspect of the invention, there is provided an apparatus comprising means for determining a measurement pattern for at least one automatic gain control tracking loop according to resource restrictions that are applied to a user equipment, the resource restrictions comprising at least one measurement restriction pattern, and means for causing the measurement pattern for at least one automatic gain control tracking loop to be transmitted to the user equipment.

In one embodiment, determining a measurement pattern for at least one automatic gain control tracking loop comprises determining the measurement pattern for the at least one automatic gain control tracking loop based on the at least one measurement restriction pattern. In one embodiment, the user equipment makes the determination of the measurement pattern for the at least one automatic gain control tracking loop.

In one embodiment, determining a measurement pattern for at least one automatic gain control tracking loop comprises receiving the measurement pattern for the at least one automatic gain control tracking loop from a base station. In this embodiment, a network entity, other than the user equipment makes the determination of the measurement pattern for the at least one automatic gain control tracking loop.

In one embodiment, a measurement pattern of an automatic gain control tracking loop is identical with at least one of a measurement restriction pattern relating to serving cell radio link monitoring/radio resource management measurements and a measurement restriction pattern relating to neighbor cell radio resource management measurements.

In one embodiment, a measurement pattern of a first automatic gain control tracking loop is identical with a measurement restriction pattern relating to serving cell radio link monitoring/radio resource management measurements; and a measurement pattern of a second automatic gain control tracking loop is complementary to the measurement restriction pattern relating to serving cell radio link monitoring/ radio resource management measurements or identical with a measurement restriction pattern relating to neighbor cell radio resource management measurements.

In one embodiment, a measurement pattern of a first automatic gain control tracking loop is identical with a measurement restriction pattern relating to first channel state information measurements; and a measurement pattern of a second automatic gain control tracking loop is identical with a measurement restriction pattern relating to second channel state information measurements. In one embodiment, a measurement pattern of a third automatic gain control tracking loop is a complement of a logical OR combination of the measurement restriction pattern relating to first channel state information measurements and the measurement restriction pattern relating to second channel state information measurements.

In one embodiment, an arbitrary number of automatic gain control tracking loops relates to the at least one measurement restriction pattern.

In one embodiment, the resource restrictions relate to enhanced inter-cell interference coordination functionality in a Long Term Evolution radio access network.

In one embodiment, the apparatus is a receiver of user equipment. In another embodiment, the apparatus is a user equipment.

Advantages relating to at least some embodiments of the invention include the possibility to apply AGC measurements more accurately in a radio access network. The advantages of at least some embodiments of the invention also include allowing for efficient AGC operation in the presence of eICIC restrictions, or in the presence of multiple configurations of measurement restrictions.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
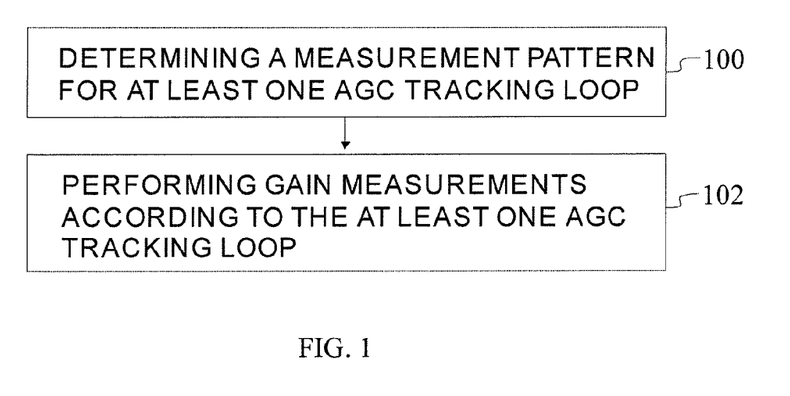
FIG. 1 is a block diagram illustrating a method according to one embodiment of the invention.

FIG. 1 is a block diagram illustrating a method according to one embodiment of the invention. An apparatus, for example user equipment, determines in step 100 a measurement pattern for at least one automatic gain control (AGC) tracking loop according to resource restrictions that are applied to a user equipment. The resource restrictions comprise at least one measurement restriction pattern. A measurement restriction pattern refers, for example, to a subset of subframes. In step 201 the apparatus performs automatic gain control measurements according to the measurement patterns of the at least one automatic gain control tracking loop. The above steps provide the possibility to apply AGC measurements more accurately in a radio access network.

In one embodiment of FIG. 1, determining a measurement pattern for at least one automatic gain control tracking loop comprises determining the measurement pattern for the at least one automatic gain control tracking loop based on the at least one measurement restriction pattern.

In another embodiment of FIG. 1, determining a measurement pattern for at least one automatic gain control tracking loop comprises receiving the measurement pattern for the at least one automatic gain control tracking loop from a base station. This means that the user equipment does not itself make the determination of the measurement pattern based on the measurement restriction patterns.

In the embodiment of FIG. 1, Long Term Evolution (LTE) radio access technology uses enhanced inter-cell interference coordination (eICIC) functionality. The radio access network includes at least one macro cell of a base station, i.e. eNodeB. One or more smaller cell (pico or femto cells) may be present in the coverage area of the macro cell. Having an additional pico or femto co-channel layer within a typical (for example homogeneous) macro network topology proves to provide significant system capacity benefit. The network nodes coordinate resources between them in such a way that overall system capacity is enhanced. User equipment (UE) may, for example, access pico layer eNodeBs with a better link budget compared to macro layer eNodeB, which leads to increased downlink throughput and better uplink coverage—meaning also less uplink transmit power, which means less uplink interference caused to other cells. The embodiment allows efficient AGC operation in the presence of eICIC restrictions, or in the presence of multiple configurations of measurement restrictions.

For example, in a macro/pico deployment, macro nodes mute a subset of subframes during which terminals connected to pico nodes can exchange data without almost any interference from the macro node. In a macro/femto deployment, closed-access femto nodes mute some subframes to allow macro terminals in their vicinity to stay connected to their serving cell. The muted subframes are called as Almost Blank Subframes (ABS). In the muted subframes, there may still be residual interference due to Common Reference Signal (CRS) transmission and other physical channels (system information, paging).

In one embodiment of FIG. 1, the measurement restriction patterns tell the user equipment when various measurements can be executed, for example, measurement relating to serving cell Radio Link Monitoring (RLM)/Radio Resource Management (RRM), neighbour cell RRM, Channel State Information (CSI) etc. The AGC tracking loops make use of these measurement restriction patterns and muted subframes when performing AGC measurements.

Figure 2:
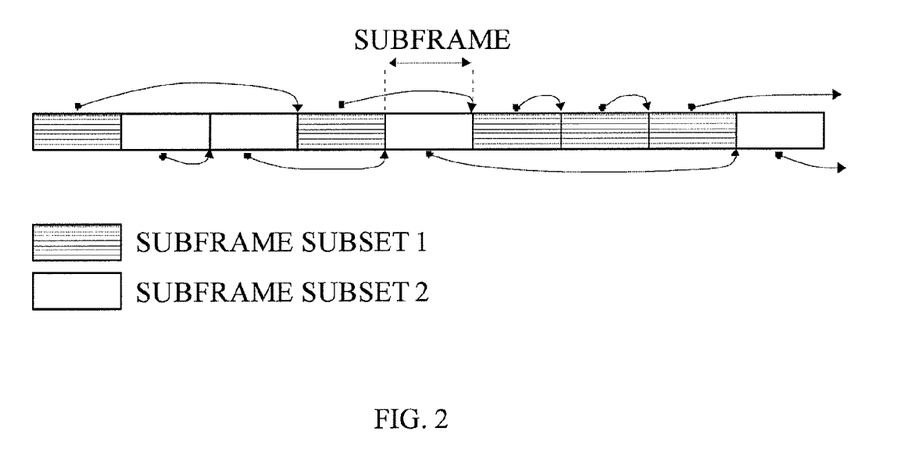
FIG. 2 illustrates general principles of automatic gain control measurements according to one embodiment of the invention.

FIG. 2 illustrates general principles of automatic gain control (AGC) measurements according to one embodiment of the invention. FIG. 2 discloses a set of subframes used in Long Term Evolution (LTE) radio access technology which uses enhanced inter-cell interference coordination (eICIC) functionality. The length of each subframe is, for example, 1 ms. An AGC of user equipment performs radio frequency gain measurements in a subframe n and applies the measurements at the start of subframe n+1. In another embodiment, the measurements can be averaged over several subframes n, n−1, n−2, . . . . FIG. 2 illustrates the general principle of performing AGC tracking per subframe subset. Rectangles filled with lines belong to a first subframes subset and empty rectangles belong to a second subframes subset. The starting point of each arrow represents the time of measurement and the end point of each arrow represents when the measurements are applied. In one embodiment, the measurements can be averaged over several subframes within the same subframe subset.

Figure 3:
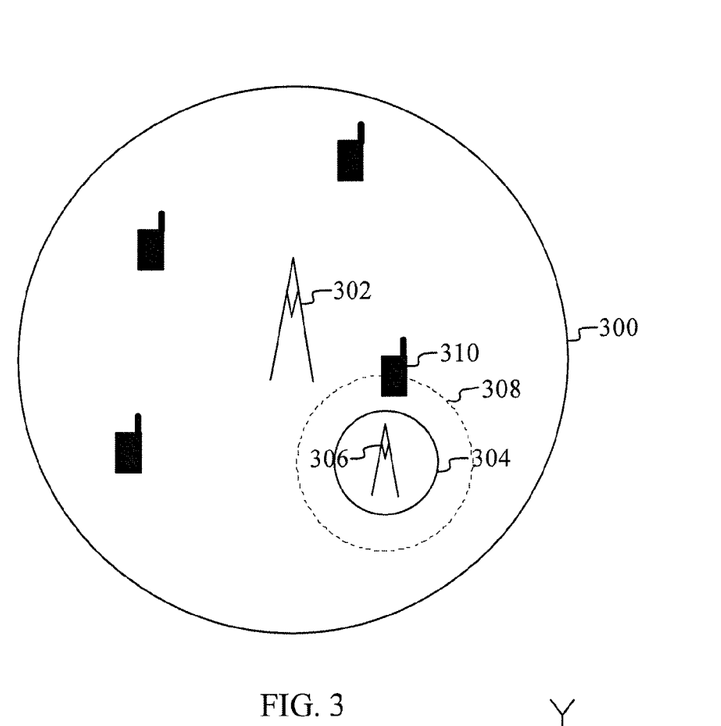
FIG. 3 illustrates a configuration between a macro cell and a pico cell according to one embodiment of the invention.

FIG. 3 discloses an embodiment according to one embodiment of the invention. The embodiment comprises a simple macro-pico scenario in a Long Term Evolution (LTE) radio access network where enhanced inter-cell interference coordination (eICIC) is applied. The simplified configuration comprises one macro cell 300 when a macro base station 302 is operating. A pico cell 304 is a smaller cell arranged, for example, to a certain location where traffic is denser than normally. A pico base station 306 operates the pico cell 304. Reference number 308 refers to an enlarged area of the pico cell 304 called as Cell Range Expansion (CRE) 308. User equipment 310 has reached the CRE 308 area. The pico cell 304 has an X2 connection to the macro cell 300.

It is assumed that user equipment (UE) 310 of the macro cell 300 is moving towards the pico cell 304 and the macro cell 300 wishes to handover the user equipment 308 to the pico cell 304 as fast as possible. In this way, the macro cell 300 offloads traffic to the pico cell 304. To offload the user equipment 310 to the pico cell 304, the macro cell 300 starts utilizing ABS (Almost Blank Subframes) subframes and configures Radio Resource Management (RRM) pattern for neighbour cell measurements for the user equipment. This means that the user equipment 310 starts trying to measure the neighbor cell(s) according to the pattern, and can find the pico cell 304 earlier than otherwise due to the lower interference level during protected subframes. The term "protected subframes" refers, for example, to subframes where the macro cell utilizes ABS subframes. After the user equipment 310 reports the pico cell 304, the macro cell 300 can handover the user equipment to the pico cell 304.

In one embodiment of FIG. 3, one automatic control gain (AGC) loop is operating with measurement restriction patterns.

TABLE 1

| Macro-Pico case | Restriction pattern, in blocks of 8 subframes 1 = Measurements allowed 0 = Measurements disallowed | | | | |
|---|---|---|---|---|---|
| Neighbour cell RRM Pattern | 10000000 | 10000000 | 10000000 | 10000000 | 10000000 |
| Serving cell RLM/RRM Pattern | 10000000 | 10000000 | 10000000 | 10000000 | 10000000 |
| Pattern for one AGC tracking loop | 10000000 | 10000000 | 10000000 | 10000000 | 10000000 |

Table 1 represents an exemplary macro-pico case, which includes measurement patterns for neighbour cell RRM and serving cell Radio Link Monitoring (RLM)/Radio Resource Management (RRM) in a Frequency Division Duplex (FDD) configuration. While within (i.e. connected to) the pico cell, the user equipment would be given the serving cell RLM/RRM pattern. This is because the user equipment would need to stay connected to the pico cell, and while it is still "closer" (in radio terms) to the macro cell, it would need protection against the macro cell interference. However, since there could be more than one pico cell, the user equipment may also need the neigbour cell RRM pattern to measure those pico cells during the protected subframes. The term "protected subframes" refers to subframes where the macro cell utilizes ABS subframes. This means that the user equipment would then have both patterns (the serving cell RLM/RRM pattern and neigbour cell RRM pattern) active at the same time. The patterns may be identical with each other (as disclosed in Table 1), but not necessarily.

Furthermore, as disclosed in Table 1, there is an AGC pattern for an AGC tracking loop. The AGC pattern causes the AGC to measure radio frequency gain during the muted subframes. The AGC tracking loop operates according to RLM/RRM pattern configured at the user equipment for eICIC.

In another embodiment of FIG. 3, two automatic control gain (AGC) loops are operating with measurement restriction patterns in user equipment.

TABLE 2

| Macro-Pico case | Restriction pattern, in blocks of 8 subframes<br>1 = Measurements allowed<br>0 = Measurements disallowed | | | | |
|---|---|---|---|---|---|
| Neighbour cell RRM Pattern | 10000000 | 10000000 | 10000000 | 10000000 | 10000000 |
| Serving cell RLM/RRM Pattern | 10000000 | 10000000 | 10000000 | 10000000 | 10000000 |
| Pattern for 1st AGC tracking loop | 10000000 | 10000000 | 10000000 | 10000000 | 10000000 |
| Pattern for $2^{nd}$ AGC tracking loop | 01111111 | 01111111 | 01111111 | 01111111 | 01111111 |

The situation disclosed in Table 2 is similar to that of Table 1. The difference is that now there are two AGC tracking loops in Table 2. The pattern relating to the first AGC tracking loop is identical with the restriction pattern for serving cell RLM/RRM measurements. The pattern relating to the second AGC tracking loop is complementary (i.e. inverse) to the restriction pattern for serving cell RLM/RRM measurements (as disclosed in Table 2) or identical with the restriction pattern for neighbor cell RRM measurements. Table 2 discloses only an exemplary situation where the pattern relating to the second AGC tracking loop is complementary to the restriction pattern for serving cell RLM/RRM measurements. Furthermore, the $1^{st}$ and $2^{nd}$ AGC tracking loop patterns may be in use simultaneously in user equipment. In another embodiment, the user equipment may not use all the configured AGC tracking loop patterns simultaneously.

The idea for having an AGC tracking loop over the complementary part of the RLM/RRM patterns is that the user equipment may happen to be scheduled over these subframes and thus the AGC needs to be controlled there as well.

In another embodiment of FIG. 3, three automatic control gain (AGC) loops are operating with measurement restriction patterns in user equipment.

CSI (CQI,PMI,RI) (CSI, Channel State information; CQI, Channel Quality Indicator; PMI, Precoding Matrix Index; RI, Rank Indicator) feedback based on interference measurement in restricted subsets of subframes is enabled through configured subsets of subframes indicated by a CSI measurement subframe configuration. Subframe subsets are signalled by Radio Resource Control (RRC) (for example with bitmaps of size matching the size of almost blank subframe pattern), 0 or 2 subframe subsets can be configured per user equipment. The user equipment only reports CSI for each configured subframe subset. If no subframe subsets are configured, interference measurement in restricted subsets of subframes is not enabled. The two CSI subframe subsets may or may not be the complement (i.e. inverse) of each other. It is assumed that two subframe subsets are configured for CSI measurement restrictions and denote the two CSI restrictive patterns by CSI_1 and CSI_2.

TABLE 3

| Macro-Pico case | Restriction pattern, in blocks of 8 subframes<br>1 = Measurements allowed<br>0 = Measurements disallowed | | | | |
|---|---|---|---|---|---|
| Neighbour cell RRM Pattern | 10000000 | 10000000 | 10000000 | 10000000 | 10000000 |
| Serving cell RLM/RRM Pattern | 10000000 | 10000000 | 10000000 | 10000000 | 10000000 |
| CSI_1 pattern | 10000000 | 10000000 | 10000000 | 10000000 | 10000000 |
| CSI_2 pattern | 00000001 | 00000001 | 00000001 | 00000001 | 00000001 |
| Pattern for 1st AGC tracking loop | 10000000 | 10000000 | 10000000 | 10000000 | 10000000 |
| Pattern for $2^{nd}$ AGC tracking loop | 00000001 | 00000001 | 00000001 | 00000001 | 00000001 |
| Pattern for $3^{rd}$ AGC tracking loop | 01111110 | 01111110 | 01111110 | 01111110 | 01111110 |

The situation disclosed in Table 3 is similar to that of Table 2. The difference is that now there are three AGC tracking loops. The pattern relating to the first AGC tracking loop is identical with the restriction pattern for first CSI measurements. The pattern relating to the second AGC tracking loop is identical with the restriction pattern for second CSI measurements. The pattern relating to the third AGC tracking loop is a complement of a logical OR combination of both CSI patterns. Furthermore, the $1^{st}$, $2^{nd}$ and $3^{rd}$ AGC tracking loop patterns may be in use simultaneously. In another embodiment, the user equipment may not use all the configured AGC tracking loop patterns simultaneously.

In this example, the patterns for neighbor cell RRM and serving cell RLM/RRM happen to coincide with CSI patterns. The idea for having an AGC tracking loop over the complementary part of the first CSI and second CSI patterns is that user equipment may happen to be scheduled over these subframes and thus the AGC needs to be controlled there as well.

In another embodiment of FIG. 3, adaptive Time Division Multiplexing (TDM) resource partitioning is used.

TABLE 4

| Macro-Pico case | Restriction pattern in blocks of 8 subframes<br>1 = Measurements allowed<br>0 = Measurements disallowed | | | | |
|---|---|---|---|---|---|
| True ABS pattern at macro (0 = non ABS, 1 = ABS, X = dynamic (ABS or not) | 1XXXXXX0 | 1XXXXXX0 | 1XXXXXX0 | 1XXXXXX0 | 1XXXXXX0 |

TABLE 4-continued

| Macro-Pico case | Restriction pattern in blocks of 8 subframes 1 = Measurements allowed 0 = Measurements disallowed | | | | |
|---|---|---|---|---|---|
| CSI_1 pattern for pico UE | 10000000 | 10000000 | 10000000 | 10000000 | 10000000 |
| CSI_2 pattern for pico UE | 00000001 | 00000001 | 00000001 | 00000001 | 00000001 |
| pattern for 1st AGC tracking loop | 10000000 | 10000000 | 10000000 | 10000000 | 10000000 |
| Pattern for $2^{nd}$ AGC tracking loop | 00000001 | 00000001 | 00000001 | 00000001 | 00000001 |
| Pattern for $3^{rd}$ AGC tracking loop | 01111110 | 01111110 | 01111110 | 01111110 | 01111110 |

Table 4 illustrates an example where macro and pico cells exchange traffic and Almost Blank Subframe (ABS) pattern information over the X2 interface on a relatively fast timescale (for example 1 to 100 ms). Offloading between macro and pico nodes becomes dynamic and depends on traffic conditions. Therefore the true ABS pattern in use at the macro cell changes relatively often, which would require frequent Radio Resource Control (RRC) reconfigurations of the user equipment if these were kept up-to-date of the true ABS pattern. One solution to avoid increased network load due to frequent RRC signaling is to configure CSI restrictions in such a way that the true ABS pattern always guarantees stable interference conditions over two subsets of subframes. This is possible if two portions of the true ABS pattern remain invariant over time, while the rest may change dynamically. As illustrated in Table 4, there are two CSI patterns, CSI_1 and CSI_2, not being complement of each other, and the network may perform adaptive TDM partitioning by dynamically changing the true ABS pattern in the subset of subframes that do not belong to either CSI_1 or CSI_2. In the exemplary patterns in Table 4, CSI_1 coincides with subframes with guaranteed (low) ABS interference and CSI_2 coincides with subframes with (high) full load non-ABS interference. Subframes marked with X can be either ABS or non-ABS at the macro depending on the true ABS pattern at a given time, and adaptive TDM partitioning is thus performed over the subset of subframes marked with X.

The $1^{st}$, $2^{nd}$ and $3^{rd}$ AGC tracking loop patterns may be in use simultaneously in user equipment. In another embodiment, the user equipment may not use all the configured AGC tracking loop patterns simultaneously.

The AGC tracking loop patterns in Table 4 are identical with the AGC tracking loop patterns in Table 3.

In another embodiment of FIG. 3, semi-static Time Division Multiplexing (TDM) resource partitioning is used.

TABLE 5

| Macro-Pico case | Restriction pattern, in blocks of 8 subframes 1 = Measurements allowed 0 = Measurements disallowed | | | | |
|---|---|---|---|---|---|
| True ABS pattern at macro (0 = non ABS, 1 = ABS) | 10000000 | 10000000 | 10000000 | 10000000 | 10000000 |
| CSI_1 pattern for pico UE | 10000000 | 10000000 | 10000000 | 10000000 | 10000000 |
| CSI_2 pattern for pico UE | 01111111 | 01111111 | 01111111 | 01111111 | 01111111 |
| Pattern for 1st AGC tracking loop | 10000000 | 10000000 | 10000000 | 10000000 | 10000000 |
| Pattern for $2^{nd}$ AGC tracking loop | 01111111 | 01111111 | 01111111 | 01111111 | 01111111 |

In this example, adaptive TDM partitioning is not used, and the true ABS pattern changes on a relatively low timescale. Reconfiguring user equipment upon such a change is not an issue from network signaling perspective as this would occur rarely. In this case at the pico user equipment, CSI_1 is simply configured to coincide with ABS (i.e. low) interference subframes at the macro cell while CSI_2 contains most (or even all) of the remaining subframes. As illustrated in Table 5, CSI_1 and CSI_2 are complement of each other, and the AGC tracking loops directly coincide with CSI_1 and CSI_2 due to this. Furthermore, the $1^{st}$ and $2^{nd}$ AGC tracking loop patterns may be in use simultaneously in user equipment. In another embodiment, the user equipment may not use all the configured AGC tracking loop patterns simultaneously.

Tables 1-5 show examples of patterns for AGC tracking loops. The determination process of the patterns for AGC tracking loops makes use, for example, of one or more known measurement restriction patterns (Neighbour cell RRM, Serving cell RLM/RRM, CSI_1 and CSI_2). Depending on the situation, the AGC tracking loop pattern may be configured to be identical with at least one of these restriction patterns or to be a complement (i.e. inverse) to the at least one of these restriction patterns. The AGC tracking loop pattern determination and configuration may be performed by a user equipment. In an alternative solution, a network entity (for example eNodeB, a network management node or any other network entity) other than the user equipment determines and configures the AGC tracking loop patterns and transmits them to the user equipment.

Furthermore, it can be seen from Tables 1-5 that an AGC tracking loop pattern may relate to one or more measurement restriction patterns. In other words, an AGC tracking loop pattern may relate, for example, to at least one of neighbour cell RRM pattern, serving cell RLM/RRM pattern, CSI_1 pattern and CSI_2 pattern). For example, in Table 2 the first AGC tracking loop is identical with the restriction pattern for serving cell RLM/RRM measurements. In another embodiment, additionally or alternatively, an AGC tracking loop pattern may relate to more than one measurement restriction pattern, for example with two measurement restriction patterns. Table 3 discloses an example where the pattern relating to the third AGC tracking loop is a complement of a logical OR combination of both CSI patterns. In other words, the third AGC tracking loop pattern is determined based on two different measurement restriction patterns (i.e. CSI_1 and CSI_2).

Figure 4:
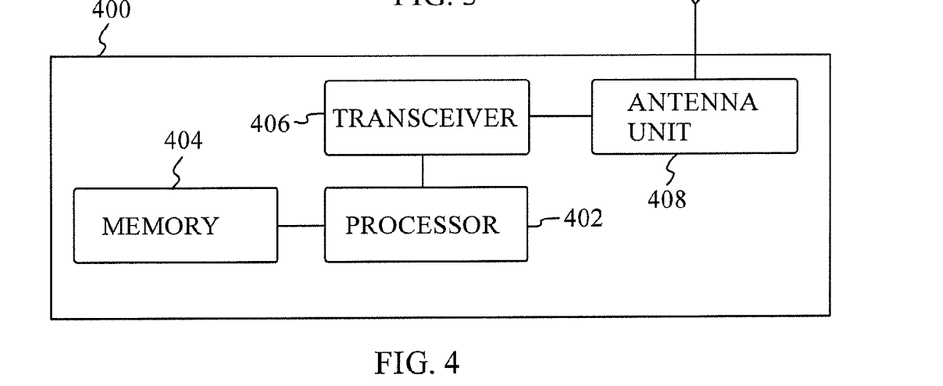
FIG. 4 illustrates a block diagram of an apparatus according to one embodiment of the present invention.

FIG. 4 discloses a simplified block diagram of an exemplary apparatus that is suitable for use in practicing the exemplary embodiments of at least part of this invention. In FIG. 4, the apparatus 400 may include a processor 402 or a plurality of processors, a memory 404 coupled to the processor 402, and a suitable transceiver 406 (having a transmitter (TX) and a receiver (RX)) coupled to the processor 402, coupled to an antenna unit 408.

The processor 402 or some other form of generic central processing unit (CPU) or special-purpose processor such as digital signal processor (DSP), may operate to control the various components of the apparatus 400 in accordance with embedded software or firmware stored in memory 404 or stored in memory contained within the processor 402 itself. In addition to the embedded software or firmware, the processor 402 may execute other applications or application modules stored in the memory 404 or made available via wireless network communications. The application software may comprise a compiled set of machine-readable instructions that configures the processor 402 to provide the desired functionality, or the application software may be high-level software instructions to be processed by an interpreter or compiler to indirectly configure the processor 402.

The transceiver 406 is for bidirectional wireless communications with another wireless device, for example an evolved NodeB. The transceiver 406 may provide, for example, frequency shifting, converting received RF signals to baseband and converting baseband transmit signals to RF. In some descriptions a radio transceiver or RF transceiver may be understood to include other signal processing functionality such as modulation/demodulation, coding/decoding, and other signal processing functions. In some embodiments, the transceiver 406, portions of the antenna unit 408, and an analog baseband processing unit may be combined in one or more processing units and/or application specific integrated circuits (ASICs).

The antenna unit 408 may be provided to convert between wireless signals and electrical signals, enabling the apparatus 400 to send and receive information from a cellular network or some other available wireless communications network or from a peer wireless device. The antenna unit 508 may include antenna tuning and/or impedance matching components, RF power amplifiers, and/or low noise amplifiers.

In one embodiment, the apparatus 400 is, for example, user equipment (UE) of a Long Term Evolution (LTE) network or of any other applicable wireless network.

Figure 5:
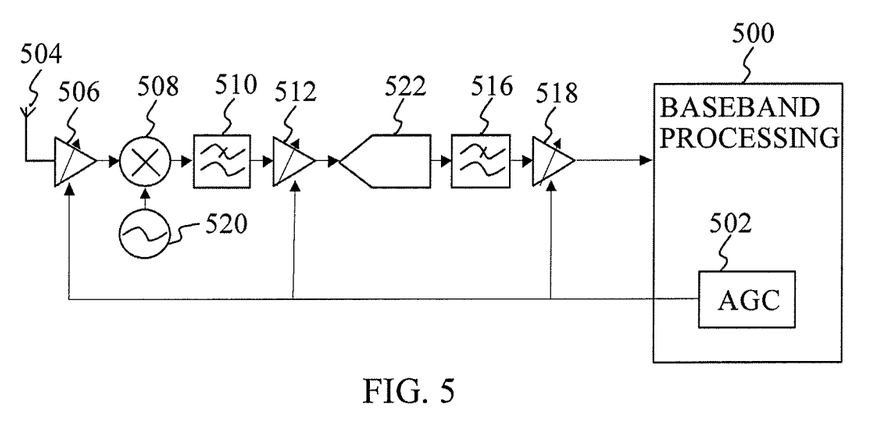
FIG. 5 discloses a block diagram of a receiver according to one embodiment of the invention.

FIG. 5 discloses a block diagram of a receiver according to one embodiment of the invention. The receiver comprises an input from an antenna 504. The antenna 504 is connected to an amplifier (LNA) 506. The output of the LNA 506 goes to a mixer 508. The mixer 508 is also connected to a local oscillator 520. The output of the mixer 508 goes to an analog channel filter 510. The output of the analog channel filter 510 is amplified by an amplifier 512. The output from the low-noise amplifier is input to an analog-to-digital converter (ADC) 522. The output from the ADC 522 is input to a digital channel filter 516. The output from the digital channel filter 516 is input to a digital gain stage 518. Finally, the output from the digital gain stage 518 is connected to a baseband processing unit 500. The baseband processing unit 500 comprises also an automatic gain control (AGC) unit 502, which is connected to the amplifiers 506, 512 and the digital gain stage 518.

Figure 6:
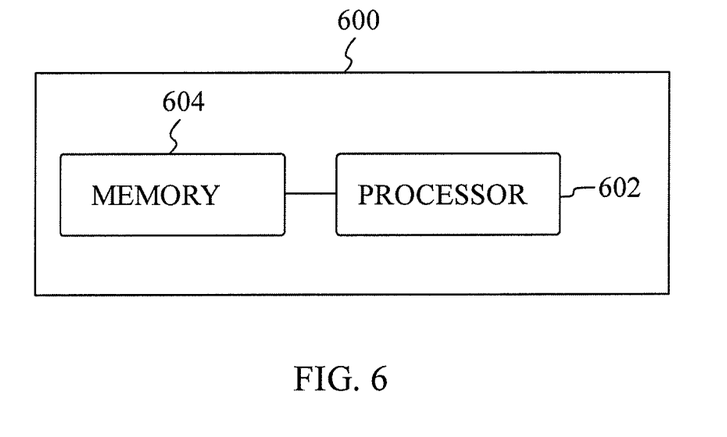
FIG. 6 discloses a simplified block diagram of an apparatus for determining a measurement pattern for at least one automatic gain control tracking loop.

FIG. 6 discloses a simplified block diagram of an apparatus 600 for determining a measurement pattern for at least one automatic gain control tracking loop. The apparatus 600 comprises a processor 602 or a plurality of processors, and a memory 604 or memories coupled to the processor 602. The processor 602 is configured to determine a measurement pattern for at least one automatic gain control (AGC) tracking loop when resource restrictions have been configured for a user equipment. The resource restrictions comprise at least one measurement restriction pattern. Each automatic gain control tracking loop is associated with at least one measurement restriction pattern. The processor 602 is further configured to cause the measurement pattern for at least one automatic gain control tracking loop to be transmitted to the user equipment. The determination is made, for example, based on the at least one measurement restriction pattern configured for the user equipment. The restriction pattern refers, for example, to a neighbor cell Radio Resource Management (RRM) pattern, a serving cell Radio Link Monitoring (RLM) or RRM pattern, or a CSI (Channel State information) pattern. Examples of measurement patterns for the AGC tracking loops are presented in Tables 1-5 above.

The apparatus 600 may be, for example, a radio access network node or a network management node or any other network entity.

In one embodiment, the term "radio frequency gain" used in the invention covers the combined gain from an antenna to the digital output of the radio frequency stage.

Furthermore, although the invention has been described by using a Frequency Division Duplex (FDD) configuration as an example, the invention may be applied also in a Time Division Duplex (TDD) configuration.

Although the invention has been described by using the Long Term Evolution (LTE) radio access technology as an example, a skilled person understand that the invention is applicable in any wireless communication network where automatic gain control functionality disclosed is needed.

For example, the invention may be implemented with an Automatic Gain Control (AGC) of user equipment as a software implementation. In another embodiment, the invention is implemented with a combination of software and hardware or with hardware only.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The exemplary embodiments can store information relating to various processes described herein. This information can be stored in one or more memories, such as a hard disk, optical disk, magneto-optical disk, RAM, and the like. The processes described with respect to the exemplary embodiments can include appropriate data structures for storing data collected and/or generated by the processes of the devices and subsystems of the exemplary embodiments in one or more databases.

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

Although various aspects of the invention are set out in the independent claims, other aspects of the invention comprise other combinations of features from the described embodiments and/or the dependent claims with the features of the independent claims, and not solely the combinations explicitly set out in the claims. The embodiments of the invention described hereinbefore in association with the figures presented may be used in any combination with each other. Several of the embodiments may be combined together to form a further embodiment of the invention.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
   determining a measurement pattern for at least one automatic gain control tracking loop according to resource restrictions that are applied to a user equipment, the resource restrictions comprising at least one measurement restriction pattern; and
   performing automatic gain control measurements according to the measurement patterns of the at least one automatic gain control tracking loop.

2. The method according to claim 1, wherein determining a measurement pattern for at least one automatic gain control tracking loop comprises:
   determining the measurement pattern for the at least one automatic gain control tracking loop based on the at least one measurement restriction pattern.

3. The method according to claim 1, wherein determining a measurement pattern for at least one automatic gain control tracking loop comprises:
   receiving the measurement pattern for the at least one automatic gain control tracking loop from a base station.

4. The method according to claim 1, wherein a measurement pattern of an automatic gain control tracking loop is identical with at least one of a measurement restriction pattern relating to serving cell radio link monitoring/radio resource management measurements and a measurement restriction pattern relating to neighbor cell radio resource management measurements.

5. The method according to claim 1, wherein
   a measurement pattern of a first automatic gain control tracking loop is identical with a measurement restriction pattern relating to serving cell radio link monitoring/radio resource management measurements; and
   a measurement pattern of a second automatic gain control tracking loop is complementary to the measurement restriction pattern relating to serving cell radio link monitoring/radio resource management measurements or identical with a measurement restriction pattern relating to neighbor cell radio resource management measurements.

6. The method according to claim 1, wherein
   a measurement pattern of a first automatic gain control tracking loop is identical with a measurement restriction pattern relating to first channel state information measurements; and
   a measurement pattern of a second automatic gain control tracking loop is identical with a measurement restriction pattern relating to second channel state information measurements.

7. The method according to claim 6, wherein a measurement pattern of a third automatic gain control tracking loop is a complement of a logical OR combination of the measurement restriction pattern relating to first channel state information measurements and the measurement restriction pattern relating to second channel state information measurements.

8. The method according to claim 1, wherein the resource restrictions relate to enhanced inter-cell interference coordination functionality in a Long Term Evolution radio access network.

9. An apparatus comprising:
   at least one processor configured to cause the apparatus to:
   determine a measurement pattern for at least one automatic gain control tracking loop according to resource restrictions that are applied to a user equipment, the resource restrictions comprising at least one measurement restriction pattern; and
   perform automatic gain control measurements according to the measurement patterns of the at least one automatic gain control tracking loop.

10. The apparatus according to claim 9, wherein in the determining the at least one processor is configured to cause the apparatus to determine the measurement pattern for the at least one automatic gain control tracking loop based on the at least one measurement restriction pattern.

11. The apparatus according to claim 9, wherein in the determining the at least one processor is configured to cause the apparatus receive the measurement pattern for the at least one automatic gain control tracking loop from a base station.

12. The apparatus according to claim 9, wherein a measurement pattern of an automatic gain control tracking loop is identical with at least one of a measurement restriction pattern relating to serving cell radio link monitoring/radio resource management measurements and a measurement restriction pattern relating to neighbor cell radio resource management measurements.

13. The apparatus according to claim 9, wherein
a measurement pattern of a first automatic gain control tracking loop is identical with a measurement restriction pattern relating to serving cell radio link monitoring/radio resource management measurements; and
a measurement pattern of a second automatic gain control tracking loop is complementary to the measurement restriction pattern relating to serving cell radio link monitoring/radio resource management measurements or identical with a measurement restriction pattern relating to neighbor cell radio resource management measurements.

14. The apparatus according to claim 9, wherein
a measurement pattern of a first automatic gain control tracking loop is identical with a measurement restriction pattern relating to first channel state information measurements; and
a measurement pattern of a second automatic gain control tracking loop is identical with a measurement restriction pattern relating to second channel state information measurements.

15. The apparatus according to claim 13, wherein a measurement pattern of a third automatic gain control tracking loop is a complement of a logical OR combination of the measurement restriction pattern relating to first channel state information measurements and the measurement restriction pattern relating to second channel state information measurements.

16. The apparatus according to claim 9, wherein the apparatus comprises user equipment.

17. The apparatus according to claim 9, wherein the resource restrictions relate to enhanced inter-cell interference coordination functionality in a Long Term Evolution radio access network.

18. A non-transitory computer-readable medium comprising a computer program bearing computer program code for use with a computer, the computer program code comprising code for:
determining a measurement pattern for at least one automatic gain control tracking loop according to resource restrictions that are applied to a user equipment, the resource restrictions comprising at least one measurement restriction pattern; and
performing automatic gain control measurements according to the measurement patterns of the at least one automatic gain control tracking loop.

19. The non-transitory computer-readable medium according to claim 18, wherein determining a measurement pattern for at least one automatic gain control tracking loop comprises:
determining the measurement pattern for the at least one automatic gain control tracking loop based on the at least one measurement restriction pattern.

20. The non-transitory computer-readable medium according to claim 18, wherein determining a measurement pattern for at least one automatic gain control tracking loop comprises:
receiving the measurement pattern for the at least one automatic gain control tracking loop from a base station.

21. The non-transitory computer-readable medium according to claim 18, wherein a measurement pattern of an automatic gain control tracking loop is identical with at least one of a measurement restriction pattern relating to serving cell radio link monitoring/radio resource management measurements and a measurement restriction pattern relating to neighbor cell radio resource management measurements.

22. The non-transitory computer-readable medium according to claim 18, wherein
a measurement pattern of a first automatic gain control tracking loop is identical with a measurement restriction pattern relating to serving cell radio link monitoring/radio resource management measurements; and
a measurement pattern of a second automatic gain control tracking loop is complementary to the measurement restriction pattern relating to serving cell radio link monitoring/radio resource management measurements or identical with a measurement restriction pattern relating to neighbor cell radio resource management measurements.

23. The non-transitory computer-readable medium according to claim 18, wherein
a measurement pattern of a first automatic gain control tracking loop is identical with a measurement restriction pattern relating to first channel state information measurements; and
a measurement pattern of a second automatic gain control tracking loop is identical with a measurement restriction pattern relating to second channel state information measurements.

24. The non-transitory computer-readable medium according to claim 23, wherein a measurement pattern of a third automatic gain control tracking loop is a complement of a logical OR combination of the measurement restriction pattern relating to first channel state information measurements and the measurement restriction pattern relating to second channel state information measurements.

25. The non-transitory computer-readable medium according to claim 18, wherein the resource restrictions relate to enhanced inter-cell interference coordination functionality in a Long Term Evolution radio access network.

* * * * *